United States Patent
Proemm et al.

(10) Patent No.: US 8,423,244 B2
(45) Date of Patent: Apr. 16, 2013

(54) DEVICE AND METHOD FOR CONTROLLED DAMPING OF A VEHICLE

(75) Inventors: Uwe Proemm, Munich (DE); Alexander Meske, Ismaning (DE); Martin Froehlich, Neufahrn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/281,970

(22) Filed: Oct. 26, 2011

(65) Prior Publication Data

US 2012/0041643 A1 Feb. 16, 2012

Related U.S. Application Data

(63) Continuation of application No. PCT/EP2010/001943, filed on Mar. 27, 2010.

(30) Foreign Application Priority Data

May 16, 2009 (DE) .......................... 10 2009 021 671

(51) Int. Cl.
*B60G 17/018* (2006.01)
(52) U.S. Cl.
USPC .................. 701/37; 701/38; 701/45; 701/48; 701/51; 340/441
(58) Field of Classification Search ...................... 701/56, 701/36, 37, 38, 45, 48, 51–54; 340/441
See application file for complete search history.

(56) References Cited

U.S. PATENT DOCUMENTS

| | | | | | |
|---|---|---|---|---|---|
| 5,157,609 | A | * | 10/1992 | Stehle et al. | 701/56 |
| 5,200,895 | A | * | 4/1993 | Emura et al. | 701/37 |
| 5,584,498 | A | * | 12/1996 | Danek | 280/5.503 |
| 5,839,082 | A | * | 11/1998 | Iwasaki | 701/38 |
| 5,841,201 | A | * | 11/1998 | Tabata et al. | 290/40 C |
| 6,285,935 | B1 | * | 9/2001 | Murata | 701/37 |
| 6,721,641 | B1 | * | 4/2004 | Denne | 701/37 |
| 7,076,351 | B2 | * | 7/2006 | Hamilton et al. | 701/37 |

(Continued)

FOREIGN PATENT DOCUMENTS

| | | |
|---|---|---|
| DE | 40 39 839 A1 | 6/1991 |
| DE | 42 12 852 A1 | 10/1992 |

(Continued)

OTHER PUBLICATIONS

International Search Report dated Aug. 5, 2010 with English translation (six (6) pages).

(Continued)

*Primary Examiner* — Thomas Black
*Assistant Examiner* — Wae Louie
(74) *Attorney, Agent, or Firm* — Crowell & Moring LLP

(57) ABSTRACT

A method and device for controlled damping of a vehicle stores a set of controller parameters R1 to Rn for controlling the damping of the unloaded vehicle as a function of the dynamic driving situation thereof 1 to n, detect a loading condition b of the vehicle, adapt the set of controller parameters R1 to Rn as a function of the detected loading condition b to a set of controlled parameters R1b to Rnb, and dams the vehicle as a function of the set of controller parameters R1b to Rnb as a function of the dynamic driving situation thereon 1 to n.

14 Claims, 2 Drawing Sheets

U.S. PATENT DOCUMENTS

| | | | |
|---|---|---|---|
| 7,197,384 B2 * | 3/2007 | Schweickhardt et al. | 701/37 |
| 7,949,445 B2 * | 5/2011 | Poilbout | 701/37 |
| 8,032,282 B2 * | 10/2011 | Yamanaka et al. | 701/37 |
| 8,060,277 B2 * | 11/2011 | Poilbout | 701/37 |
| 2004/0119250 A1 * | 6/2004 | Rehra et al. | 280/5.507 |
| 2008/0243336 A1 * | 10/2008 | Fitzgibbons | 701/38 |
| 2009/0037051 A1 * | 2/2009 | Shimizu et al. | 701/38 |
| 2009/0099727 A1 * | 4/2009 | Ghoneim | 701/36 |
| 2010/0138108 A1 * | 6/2010 | Kajino | 701/38 |
| 2010/0292894 A1 * | 11/2010 | Essaili et al. | 701/37 |
| 2011/0160960 A1 * | 6/2011 | Kajino et al. | 701/38 |
| 2012/0041643 A1 * | 2/2012 | Proemm et al. | 701/37 |
| 2012/0062375 A1 * | 3/2012 | Takeuchi et al. | 340/441 |

FOREIGN PATENT DOCUMENTS

| | | |
|---|---|---|
| DE | 44 36 441 A1 | 4/1995 |
| DE | 199 22 745 A1 | 12/2000 |
| DE | 100 33 770 A1 | 1/2002 |
| DE | 102 57 008 A1 | 6/2004 |
| EP | 0 237 919 A2 | 9/1987 |
| JP | 2-81710 A | 3/1990 |
| JP | 5-50822 A | 3/1993 |

OTHER PUBLICATIONS

German Search Report dated Feb. 23, 2010 with partial English translation (nine (9) pages).

* cited by examiner

DEVICE AND METHOD FOR CONTROLLED DAMPING OF A VEHICLE

CROSS-REFERENCE TO RELATED APPLICATIONS

This application is a continuation of PCT International Application No. PCT/EP2010/001943, filed Mar. 27, 2010, which claims priority under 35 U.S.C. §119 from German Patent Application No. DE 10 2009 021 671.5, filed May 16, 2009, the entire disclosures of which are herein expressly incorporated by reference.

BACKGROUND AND SUMMARY OF THE INVENTION

The invention relates to a device and a method for the controlled damping of the body movement as well as the wheel movement of a vehicle as a function of its dynamic driving situation.

In such a case, by preselecting different comfort and damping modes, the driver of the vehicle should especially be able to cause the vehicle, for example, in the "comfort mode", to have a soft comfortable damping of the vehicle body with respect to the vehicle wheels, while, in the case of a "standard" adjustment, a normal damping will be present. And, in a "sporty" mode, a hard to extremely hard damping will be provided. The different damping is carried out particularly by way of controlled adjusting damper systems arranged between the vehicle body and the wheels.

Such a control of the damping of a vehicle as a function of different preselected comfort modes is known from German Patent document 100 33 770 A1. Furthermore, reference is made to German Patent document DE 42 12 852 A1, which describes a wheel suspension system of a motor vehicle with a damping controlled as a function of the dynamic driving situation and of the loading condition of the vehicle.

Such systems change the damping particularly depending on the driving situation of the vehicle and thereby provide a particularly high comfort level while high dynamics of vehicle handling are simultaneously preserved. Known devices for the controlled changing of the damping of a vehicle operate by using a fixed set of parameters which covers all dynamic driving situations.

In particular, in the case of vehicles cushioned by steel springs in connection with a high load, the very high definition of comfort may then result in the occurrence of a "bottoming" of the wheels. This means that the damping is not sufficient, that instead the entire spring travel is used up and that the wheel suspension strikes hard against the vehicle body. On the one hand, this can be felt and heard by the vehicle occupants and clearly reduces comfort. On the other hand, the bottoming may also lead to damage to the participating components.

This problem can be remedied if, besides depending on the dynamic driving situation as such, additionally the loading of the vehicle is taken into account when adjusting or controlling the damping. In this sense, the above-mentioned German Patent document DE 42 12 852 A1 describes a vehicle in the case of which so-called characteristic damping force values are changed by several steps from a soft to a hard adjustment if the loading capacity of the vehicle exceeds a predefined value. However, this basically known approach cannot simply be taken over for existing control concepts with a damping that is variable as a function of the dynamic driving situation because this would result in a significant limitation of the variable damping that, as desired, is adapted as finely as possible for different dynamic driving situations.

It is therefore an object of the invention to provide a device and a method for the automatically controlled or controlled damping of a vehicle, in the case of which also at a high or different loading of the vehicle, a comfortable damping in all conditions of driving dynamics will be ensured in a favorable manner.

According to the invention, this and other objects are achieved by a device and method for the controlled damping of a vehicle, having a storage unit for storing a set of controller parameters R1 to Rn for controlling the damping of the unloaded vehicle as a function of its dynamic driving situation 1 to n, a detecting unit for detecting a loading condition b of the vehicle, an adaptation unit for adapting the set of controller parameters R1 to Rn as a function of the detected loading condition b to a set of controller parameters R1b to Rnb, and a damper for damping the vehicle as a function of the set of controller parameters R1b to Rnb as a function of its dynamic driving situation 1 to n. The storage unit is adjusted for storing at least two sets of controller parameters $R1_{k1}$ to $Rn_{k1}$ and $R1_{k2}$ to $Rn_{k2}$ for different comfort modes k1, k2 of the unloaded vehicle, and is adjusted either for storing for each set a set of controller parameters $R1B_{k1}$ to $RnB_{k1}$ and $R1B_{k2}$ to $RnB_{k2}$ for the fully loaded vehicle or a single set of controller parameters R1B to RnB for the fully loaded vehicle. Furthermore, the adaptation unit is adjusted for determining the set of controller parameters R1b to Rnb by a selection of the comfort mode and a mathematical interpolation between the thereby selected set of controller parameters for the unloaded vehicle and the pertaining or single set of controller parameters for the fully loaded vehicle.

In the present case, a device for the controlled damping of a vehicle is provided which comprises a storage unit for storing a set of controller parameters R1 to Rn for controlling the damping of the unloaded vehicle as a function of its dynamic driving situation 1 to n (in which case n is a natural number greater than 1), a detecting unit for detecting a loading condition b of the vehicle, an adaptation unit for adapting the set of controller parameters R1 to Rn as a function of the detected loading condition b to a set of controller parameters R1b to Rnb, and a damper for damping the vehicle as a function of the set of controller parameters R1b to Rnb as a function of its dynamic driving situation 1 to n.

It was recognized that a very large number of possible influence factors would always have to be taken into account when damping a vehicle. In addition to the actual dynamic driving situation, such influence factors are, for example, a driving speed not appropriate for the base surface, the wind pressure at the vehicle, different tire pressures, the driver's steering behavior and much more. Although it would be technically feasible to take all theses factors into account, in view of the costs, the resulting product would not be marketable. In contrast, according to the invention, the loading condition of the vehicle was selected as the single additional factor that is taken into account for the damping of the vehicle in addition to the dynamic driving situation. In this manner, the solution according to the invention creates in a cost-effective and simultaneously considerably more comfortable damping. The invention thereby additionally utilizes the technique of and the experience with existing systems in that the starting point is the currently used set of controller parameters R1 to Rn for the unloaded vehicle. This set of controller parameters is only changed in the direction of a detected loading condition of the vehicle. Systems existing at the vehicle can be advantageously used also for detecting the loading condition. Particularly in the case of steel-spring-cushioned vehicles, level sensors and, in the case of air-suspended vehicles, pressure sensors are advantageously queried, or a combination of such test signals is analyzed. It is an advantage that, as a rule, at least the level sensors in the corresponding vehicles are part of the standard equipment, so that no additional costs will arise.

In a first embodiment of the device according to the invention, the storage unit is adjusted for storing at least two sets of controller parameters R1$k$1 to Rnk1 and R1$k$2 to Rnk2 for different comfort modes k1, k2 of the unloaded vehicle, and adjusted for storing for each set a set of controller parameters R1Bk1 to RnBk1 and R1Bk2 to RnBk2 for the fully loaded vehicle, and the adaptation unit is adjusted for determining the set of controller parameters R1$b$ to Rn$b$ by means of a selection of the comfort mode and a mathematical interpolation between the thereby selected set of controller parameters for the unloaded vehicle and the pertaining set of controller parameters for the fully loaded vehicle.

By way of this first embodiment, a functionally optimal solution is created which, however, still requires comparatively high expenditures with respect to data handling, thus the storage and processing of the stored data. In the case of this approach, the sets of controller parameters are doubled, one parameter set being provided for the unloaded and one parameter set being provided for the loaded vehicle condition. The parameter set used for the actual controlling is calculated from these two sets while taking the actual loading condition into account. A storing of intermediately stored data sets requiring much higher expenditures is thereby eliminated. In particular, an adjustable, partly linear interpolation is used as the calculating method.

In a second embodiment of the device according to the invention, the storage unit is adjusted for storing at least two sets of controller parameters R1$k$1 to Rnk1 and R1$k$2 to Rnk2 for different comfort modes k1, k2 of the unloaded vehicle, and adjusted for storing a single set of controller parameters R1B to RnB for the fully loaded vehicle, and the adaptation unit is adjusted for determining the set of controller parameters R1$b$ to Rn$b$ by means of a selection of the comfort mode and a mathematical interpolation between the thereby selected set of controller parameters for the unloaded vehicle and the single set of controller parameters for the fully loaded vehicle.

By way of this second embodiment, the required storage space can be further reduced. Furthermore, the pertaining damping system can be coordinated more easily with the only one parameter set for the fully loaded condition. A coordination with three different modes for the fully loaded condition is, however, eliminated. This embodiment nevertheless meets the requirements of "preventing a bottoming" and of "increasing the driving comfort." Low application expenditures and a storage-space-saving presentation justify the possibly resulting compromises with respect to the achieved driving comfort.

For the further reduction of the required storage space, in the case of the device according to the invention, the storage unit is adjusted for storing at least two sets of controller parameters R1$k$1 to Rnk1 and R1$k$2 to Rnk2 for different comfort modes k1, k2 of the unloaded vehicle, of which one set is designed for a maximally hard damping of the vehicle, and the adaptation unit is adjusted for determining the set of controller parameters R1$b$ to Rn$b$ by means of a selection of the comfort mode and a mathematical interpolation between the thereby selected set of controller parameters for the unloaded vehicle and the set of controller parameters for the maximally hard damping of the vehicle.

This further development is based on the circumstance that, in the case of relevant vehicles, a maximally hard damping is designed in the "sporty" mode in which, if possible, no "bottoming" will occur even if the vehicle is fully loaded. This type of design of the maximally hard damping is now, according to the invention, utilized as a maximal parameter set also for the remaining comfort modes, such as "comfort" and "standard" with regard to a fully loaded vehicle in these modes. Therefore, no separately generated parameter set for the "fully loaded vehicle" condition is necessary in the memory.

In an advantageous further development of the device according to the invention, an intensified basic damping of the vehicle is taken into account with each set of controller parameters for the fully loaded vehicle.

This further development is based on a derivation from the active physical chain as the loading of a vehicle increases. The additional loading results in a displacement of the center of gravity and in an increase in mass, to which a reaction according to the invention takes place, as explained above.

In an additional advantageous further development of the device according to the invention, an increased damping against a lifting, pitching and/or rolling of the vehicle is taken into account with each set of controller parameters for the fully loaded vehicle. Such an adjustment of the controller parameters acts especially against the increase in mass at the vehicle when the latter is loaded.

In yet another advantageous further development of the device according to the invention, an increased damping of the rearward structure of the vehicle is taken into account with each set of controller parameters for the fully loaded vehicle. This further development is based on the recognition that, with an additional load, in the case of known vehicles, as a rule, their center of gravity is displaced toward the rear and, as a result, the distribution of the weight to the front and the rear axle also changes.

According to the invention, this object is further achieved correspondingly by a method for the controlled damping of a vehicle. The further developments explained for the device also exist analogously for this method.

By means of the solution according to the invention and its further developments, a "bottoming" of the wheels can be prevented or at least reduced or lessened in all operating conditions of a vehicle. Particularly in the case of vehicles without a level control system, the vibration comfort is considerably increased in a cost-effective manner. Damage to components, such as axles, springs, dampers as well as their connection to the vehicle body, can be reduced. The service life of such components is thereby lengthened. Finally, the manufacturing costs of pertaining axle systems, as a whole, can also be reduced because the components can be constructed in such a manner that a lower collective load is adhered to.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
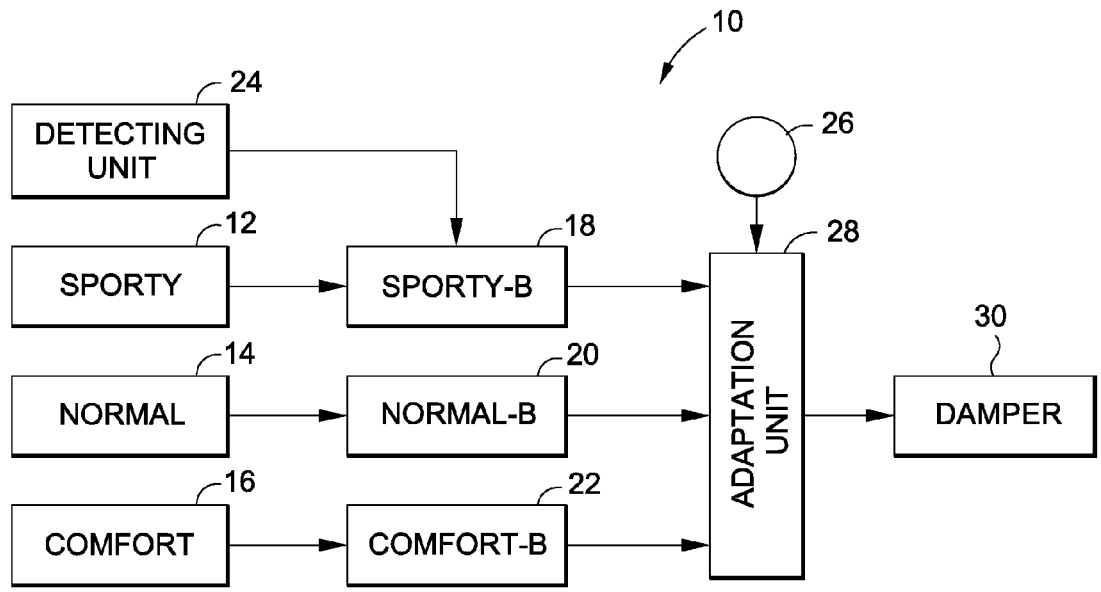
FIG. 1 is a simplified schematic representation of a first embodiment of a device according to the invention for the controlled damping of a vehicle.

FIG. 1 illustrates a device 10 for the controlled damping of a vehicle, in which a set of controller parameters 12 with parameters R1$k$1 to Rnk1 for a comfort mode k1 or "sporty", a set of controller parameters 14 with parameters R1$k$2 to Rnk2 for a comfort mode k2 or "normal", as well as a set of controller parameters 16 with parameters R1$k$3 to Rnk3 for a comfort mode k3 or "comfort" are stored in a storage unit. In this case, the storage unit is in the form of a memory chip within an electronic control, but of course could take any equivalent form. Furthermore, a set of controller parameters 18 with parameters R1Bk1 to RnBk1 for a comfort mode k1-B or "sporty-B", a set of controller parameters 20 with parameters R1Bk2 to RnBk2 for a comfort mode k2-B or "normal-B", as well as a set of controller parameters 22 with parameters R1Bk3 to RnBk3 for a comfort mode k3-B or "comfort-B" are stored in the storage unit. The designation "B" stands for the fully loaded condition of the vehicle.

The loading of the vehicle is determined on the device 10 by a detecting unit 24, which detects the loading condition of the vehicle. In this case, the actual loading b of the vehicle will, as a rule, be below the maximally permissible loading B of the fully loaded vehicle. The detection unit 24 therefore determines the actually prevailing loading condition of the vehicle.

Furthermore, a preselecting switch 26 is provided on the vehicle, by means of which switch 26, the driver of the vehicle can preset in which comfort mode he wants to drive the vehicle; thus, whether he wants to select the "sporty" comfort mode, the "normal" comfort mode or the "comfort" comfort mode, so that the vehicle will correspondingly be spring-cushioned and damped in a sporty, normal or more comfort-oriented manner with respect to its dynamic driving behavior.

The preselection of the comfort mode and the loading condition of the vehicle are taken into account at an adaptation unit 28 for adapting the relevant set of controller parameters R1 to Rn. In the embodiment according to FIG. 1, when the "sporty" comfort mode is selected, a mathematical interpolation is carried out between the set of controller parameters 12 and the pertaining set of controller parameters 18. When the comfort mode "normal" is selected, a mathematical interpolation takes place between the set of controller parameters 14 and the set of controller parameters 20. When the comfort mode "comfort" is selected, a mathematical interpolation takes place for the actual loading condition b between the set of controller parameters 16 and the set of controller parameters 22.

Figure 4:
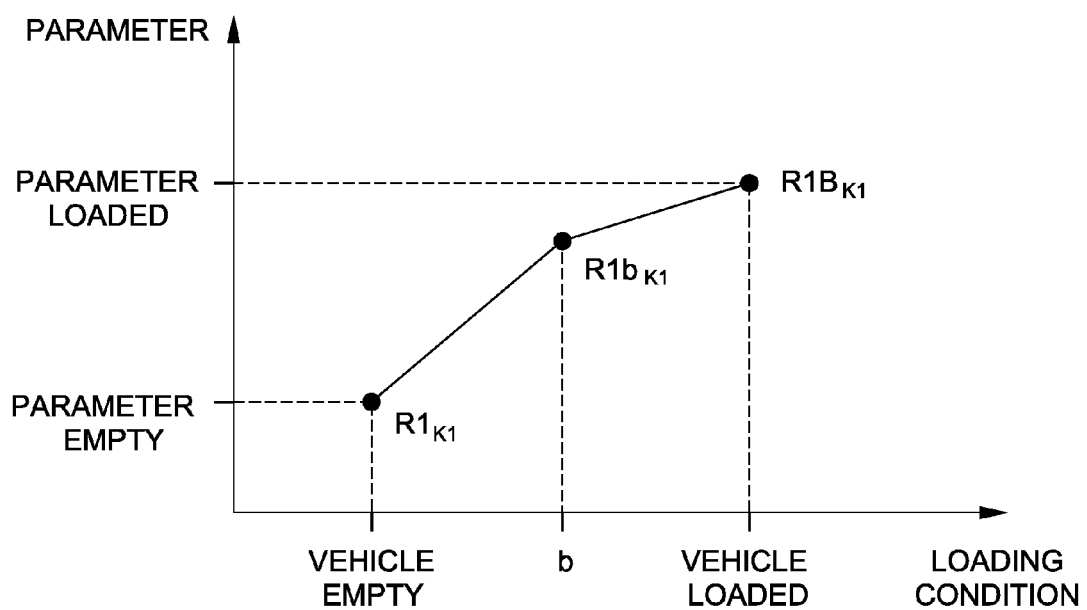
FIG. 4 is a graphical diagram of the step of "Adapting the Set of Controller Parameters R1b to Rnb" in the case of one of the devices according to FIGS. 1 to 3.

In FIG. 4, the type of mathematical interpolation is illustrated as an example in the "sporty" comfort mode for parameter R1$k$1 to the parameter R1Bk1 (Y-axis). It is shown that the interpolation for parameter R1$bk$1 determined for the relevant loading condition b does not absolutely have to take place in a linear fashion for the entire loading change (X-axis) from the loading condition "empty" to the loading condition "loaded" or "fully loaded", but that linear interpolations also make sense only in sections.

At a damper 30 according to FIG. 1 for damping the vehicle, the interpolated parameters R1b to Rnb are finally used for the actual damping of the vehicle as a function of its loading condition b.

Figure 2:
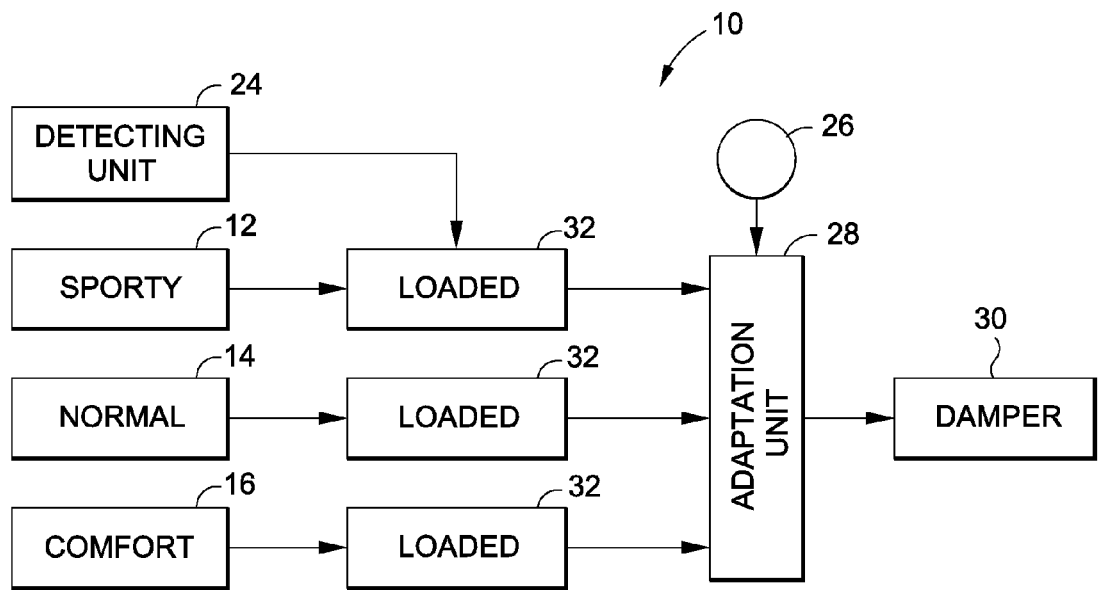
FIG. 2 is a simplified schematic representation of a second embodiment of a device according to the invention for the controlled damping of a vehicle.

FIG. 2 illustrates a device 10 in the case of which also a set of controller parameters 12 with parameters R1$k$1 to Rnk1 for a comfort mode k1 or "sporty", a set of controller parameters 14 with parameters R1$k$2 to Rnk2 for a comfort mode k2 or "normal", as well as a set of controller parameters 16 with parameters R1$k$3 to Rnk3 for a comfort mode k3 or "comfort" are stored. Furthermore, only a single set of controller parameters 32 with parameters R1B to RnB are stored for a fully loaded condition of the vehicle. This parameter set 32 is used for all three comfort modes "sporty", "normal" and "comfort" if, by the pertaining adaptation unit 28, a set of controller parameters R1b to Rnb that is adjusted to the respective loading situation b is adapted. In this case, the adaptation takes place corresponding to the manner illustrated in FIG. 4, in which case, however, as mentioned, in all comfort modes, always the same parameter set 32 with the parameters R1B to RnB is used as the parameter set for the "loaded" or "fully loaded" condition.

Figure 3:
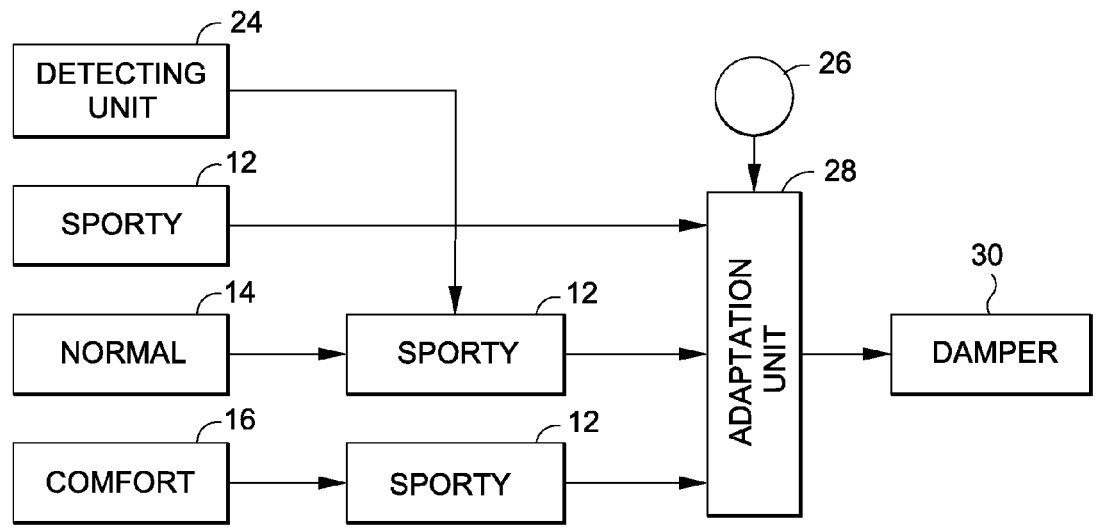
FIG. 3 is a simplified schematic representation of a third embodiment of a device according to the invention for the controlled damping of a vehicle.

FIG. 3 illustrates an embodiment of a device 10, in which no separate parameter set at all is stored for the fully loaded condition of the vehicle. Instead, for the above-explained interpolation in the comfort modes "normal" and "comfort", parameter set 12 with the parameters R1$k$1 to Rnk1 of the comfort mode k1 or "sporty" is used as a parameter set of a maximal loading. In the "sporty" operating mode itself, no loading-dependent adaptation of the pertaining parameter set takes place. Instead, only a single set of controller parameters R1$k$1 to Rnk1 is used over the entire period of the loading.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device for controlled damping of a vehicle, the device comprising:

a storage unit for storing a set of controller parameters R1 to Rn for controlling damping of an unloaded vehicle as a function of a dynamic driving situation 1 to n of the vehicle;

a detecting unit for detecting a loading condition b of the vehicle;

an adaptation unit for adapting the set of controller parameters R1 to Rn as a function of the detected loading condition b to a set of controller parameters R1b to Rnb; and a damper for damping the vehicle as a function of the set of controller parameters R1b to Rnb as a function of the dynamic driving situation 1 to n, wherein:

the storage unit adjusts for storing at least two sets of controller parameters $R1_{k1}$ to $Rn_{k1}$ and $R1_{k2}$ to $Rn_{k2}$ for different comfort modes k1, k2 of the unloaded vehicle, the storage unit adjusts either for storing for each set a set of controller parameters $R1B_{k1}$ to $RnB_{k1}$ and $R1B_{k2}$ to $RnB_{k2}$ for a fully loaded vehicle or a single set of controller parameters R1B to RnB for the fully loaded vehicle, the adaptation unit adjusts for determining the set of controller parameters R1b to Rnb by a driver pre-selection of one of a plurality of different comfort modes and a mathematical interpolation between the thereby selected set of controller parameters for the unloaded vehicle and the pertaining or single set of controller parameters for the fully loaded vehicle.

2. The device according to claim 1, wherein an increased basic damping of the vehicle is factored into account with each set of controller parameters for the fully loaded vehicle.

3. The device according to claim 2, wherein an increased damping against at least one of a lifting, a pitching and a rolling of the vehicle is factored into account with each set of controller parameters for the fully loaded vehicle.

4. The device according to claim 2, wherein an increased damping of a rearward structure of the vehicle is factored into account with each set of controller parameters for the fully loaded vehicle.

5. The device according to claim 1, wherein an increased damping against at least one of a lifting, a pitching and a rolling of the vehicle is factored into account with each set of controller parameters for the fully loaded vehicle.

6. The device according to claim 5, wherein an increased damping of a rearward structure of the vehicle is factored into account with each set of controller parameters for the fully loaded vehicle.

7. The device according to claim 1, wherein an increased damping of a rearward structure of the vehicle is factored into account with each set of controller parameters for the fully loaded vehicle.

8. A method for controlled damping of a vehicle, the method comprising the acts of:
    storing a set of controller parameters R1 to Rn for controlling damping of an unloaded vehicle as a function of the dynamic driving situation 1 to n of the vehicle;
    detecting a loading condition b of the vehicle;
    adapting the set of controller parameters R1 to Rn as a function of the detected loading condition b to a set of controller parameters R1$b$ to Rnb; and
    damping the vehicle as a function of the set of controller parameters R1$b$ to Rnb as a function of the dynamic driving situation 1 to n of the vehicle;
    wherein, during the storing act, at least two sets of controller parameters $R1_{k1}$ to $Rn_{k1}$ and $R1_{k2}$ to $Rn_{k2}$ for different comfort modes k1, k2 of the unloaded vehicle, and either, for each set, a set of controller parameters $R1B_{k1}$ to $RnB_{k1}$ and $R1B_{k2}$ to $RnB_{k2}$ for the fully loaded vehicle or a single set of controller parameters R1B to RnB for the fully loaded vehicle, are stored; and
    wherein, during the adapting act, the set of controller parameters R1$b$ to Rnb is determined by a driver preselection of one of a plurality of different comfort modes and a mathematical interpolation between the thereby selected set of controller parameters for the unloaded vehicle and the pertaining or single set of controller parameters for the fully loaded vehicle.

9. The method according to claim 8, further comprising the act of:
    taking into account an increased basic damping of the vehicle with each set of controller parameters for the fully loaded vehicle.

10. The method according to claim 9, further comprising the act of:
    taking into account an increased damping against at least one of a lifting, a pitching, and a rolling of the vehicle with each set of controller parameters for the fully loaded vehicle.

11. The method according to claim 9, further comprising the act of:
    taking into account an increased damping of the rearward structure of the vehicle with each set of controller parameters for the fully loaded vehicle.

12. The method according to claim 8, further comprising the act of:
    taking into account an increased damping against at least one of a lifting, a pitching, and a rolling of the vehicle with each set of controller parameters for the fully loaded vehicle.

13. The method according to claim 12, further comprising the act of:
    taking into account an increased damping of the rearward structure of the vehicle with each set of controller parameters for the fully loaded vehicle.

14. The method according to claim 8, further comprising the act of:
    taking into account an increased damping of the rearward structure of the vehicle with each set of controller parameters for the fully loaded vehicle.

* * * * *